(12) United States Patent
Jeong et al.

(10) Patent No.: US 12,519,174 B2
(45) Date of Patent: Jan. 6, 2026

(54) UNIT CELL AND BATTERY CELL INCLUDING THE SAME

(71) Applicant: LG Energy Solution, Ltd., Seoul (KR)

(72) Inventors: Hyeok Jeong, Daejeon (KR); Seong Won Choi, Daejeon (KR); Yong Jun Lee, Daejeon (KR); Su Taek Jung, Daejeon (KR); Soon Kwan Kwon, Daejeon (KR); Sangho Bae, Daejeon (KR); Minwook Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 838 days.

(21) Appl. No.: 17/750,930

(22) Filed: May 23, 2022

(65) Prior Publication Data
US 2022/0376348 A1 Nov. 24, 2022

(30) Foreign Application Priority Data

May 24, 2021 (KR) .................. 10-2021-0066460
Apr. 19, 2022 (KR) .................. 10-2022-0048386

(51) Int. Cl.
*H01M 50/46* (2021.01)
*H01M 50/198* (2021.01)
*H01M 50/291* (2021.01)

(52) U.S. Cl.
CPC ....... *H01M 50/291* (2021.01); *H01M 50/198* (2021.01); *H01M 50/461* (2021.01); *H01M 2220/20* (2013.01)

(58) Field of Classification Search
CPC ............ H01M 50/291; H01M 50/198; H01M 50/461; H01M 2220/20; H01M 50/105; H01M 50/103; Y02E 60/10; Y02P 70/50
See application file for complete search history.

(56) References Cited

U.S. PATENT DOCUMENTS

| | | | |
|---|---|---|---|
| 4,049,882 A | 9/1977 | Beatty | |
| 4,080,727 A | 3/1978 | Stolle et al. | |
| 5,981,107 A * | 11/1999 | Hamano | H01M 10/05 429/231.95 |
| 6,051,342 A | 4/2000 | Hamano et al. | |
| 8,617,257 B2 | 12/2013 | Kadowaki et al. | |

(Continued)

FOREIGN PATENT DOCUMENTS

| | | |
|---|---|---|
| CN | 107925114 A | 4/2018 |
| CN | 108701855 A | 10/2018 |

(Continued)

OTHER PUBLICATIONS

Extended European Search Report including Search Opinion from EP Appl. No. 22811500.2, dated Aug. 13, 2024, pp. 1-10.

(Continued)

*Primary Examiner* — Muhammad S Siddiquee
(74) *Attorney, Agent, or Firm* — Lerner David LLP

(57) ABSTRACT

A unit includes an electrode positioned between a first separator and a second separator in a stack. A first adhesive is positioned between the electrode and at least one of the first and second separators, and a second adhesive is positioned between the first separator and the second separator. The first adhesive composition has a degree of dispersion in an electrolyte that is larger than a degree of dispersion of the second adhesive composition in the electrolyte.

18 Claims, 5 Drawing Sheets

(56) References Cited

U.S. PATENT DOCUMENTS

| | | | |
|---|---|---|---|
| 9,356,312 | B2 | 5/2016 | Lee et al. |
| 10,476,096 | B2 | 11/2019 | Kim et al. |
| 2002/0182490 | A1 | 12/2002 | Cho et al. |
| 2006/0073380 | A1 | 4/2006 | Kim et al. |
| 2010/0310930 | A1* | 12/2010 | Park ................. B32B 27/308 |
| | | | 429/185 |
| 2011/0129722 | A1 | 6/2011 | Yoneda |
| 2011/0177383 | A1 | 7/2011 | Culver et al. |
| 2013/0224552 | A1 | 8/2013 | Hong et al. |
| 2013/0316205 | A1 | 11/2013 | Kim et al. |
| 2014/0037857 | A1 | 2/2014 | Cheverton et al. |
| 2014/0154565 | A1 | 6/2014 | Ku et al. |
| 2014/0329141 | A1 | 11/2014 | Onizuka et al. |
| 2015/0093629 | A1* | 4/2015 | Sayre ................. H01M 50/545 |
| | | | 429/185 |
| 2015/0180082 | A1 | 6/2015 | Jung et al. |
| 2015/0325884 | A1 | 11/2015 | Fukunaga et al. |
| 2016/0111699 | A1 | 4/2016 | Ahn et al. |
| 2017/0012266 | A1 | 1/2017 | Arora et al. |
| 2017/0117509 | A1 | 4/2017 | Schumann et al. |
| 2017/0179453 | A1 | 6/2017 | Uejima et al. |
| 2017/0331091 | A1 | 11/2017 | Modeki |
| 2017/0358783 | A1* | 12/2017 | Kim ................. H01M 10/61 |
| 2018/0034028 | A1 | 2/2018 | Jung et al. |
| 2018/0323415 | A1 | 11/2018 | Lee et al. |
| 2018/0351149 | A1 | 12/2018 | Akiike et al. |
| 2019/0044177 | A1* | 2/2019 | Lee ................. H01M 10/0459 |
| 2019/0181412 | A1* | 6/2019 | Li ................. H01M 10/0566 |
| 2019/0221808 | A1* | 7/2019 | Honda ............. H01M 10/0525 |
| 2020/0028200 | A1 | 1/2020 | Sauerteig et al. |
| 2020/0161617 | A1 | 5/2020 | Heo et al. |
| 2020/0411896 | A1 | 12/2020 | Hong et al. |
| 2021/0320336 | A1 | 10/2021 | Ahn et al. |
| 2021/0344048 | A1* | 11/2021 | Sato ................. H01M 50/461 |
| 2022/0123297 | A1 | 4/2022 | Lee et al. |

FOREIGN PATENT DOCUMENTS

| | | | |
|---|---|---|---|
| EP | 3940826 | A1 | 1/2022 |
| EP | 3951972 | A1 | 2/2022 |
| JP | H11121044 | A | 4/1999 |
| JP | 2002251991 | A | 9/2002 |
| JP | 2004071358 | A | 3/2004 |
| JP | 2009088279 | A | 4/2009 |
| JP | 2010238425 | A | 10/2010 |
| JP | 2011165359 | A | 8/2011 |
| JP | 2014534599 | A | 12/2014 |
| JP | 5687443 | B2 | 3/2015 |
| JP | 2015532766 | A | 11/2015 |
| JP | 2016103376 | A | 6/2016 |
| JP | 2017050215 | A | 3/2017 |
| JP | 201784732 | A | 5/2017 |
| JP | 2018506820 | A | 3/2018 |
| JP | 2018113122 | A | 7/2018 |
| JP | 2018520491 | A | 7/2018 |
| JP | 2018152226 | A | 9/2018 |
| JP | 2019053862 | A | 4/2019 |
| JP | 2019091581 | A | 6/2019 |
| JP | 2019192339 | A | 10/2019 |
| JP | 2019530176 | A | 10/2019 |
| JP | 2020173923 | A | 10/2020 |
| JP | WO2020-054801 | A1 | 8/2021 |
| KR | 19980064181 | A | 10/1998 |
| KR | 20010086415 | A | 9/2001 |
| KR | 100614390 | B1 | 8/2006 |
| KR | 20070108764 | A | 11/2007 |
| KR | 20080017114 | A | 2/2008 |
| KR | 20080021166 | A | 3/2008 |
| KR | 101084909 | B1 | 11/2011 |
| KR | 20110138719 | A | 12/2011 |
| KR | 101168650 | B1 | 7/2012 |
| KR | 20130102498 | A | 9/2013 |
| KR | 101589811 | B1 | 1/2016 |
| KR | 20160038600 | A | 4/2016 |
| KR | 20160039380 | A | 4/2016 |
| KR | 20160109408 | A | 9/2016 |
| KR | 20160117109 | A | 10/2016 |
| KR | 20170022042 | A | 3/2017 |
| KR | 20170027677 | A | 3/2017 |
| KR | 20170094713 | A | 8/2017 |
| KR | 20170101582 | A | 9/2017 |
| KR | 2017-0111234 | A | 10/2017 |
| KR | 101783916 | B1 | 10/2017 |
| KR | 20180000605 | A | 1/2018 |
| KR | 20180025805 | A | 3/2018 |
| KR | 20180026972 | A | 3/2018 |
| KR | 20180028411 | A | 3/2018 |
| KR | 20180080908 | A | 7/2018 |
| KR | 2018-0093321 | A | 8/2018 |
| KR | 20190097666 | A | 8/2019 |
| KR | 102071835 | B1 | 1/2020 |
| KR | 20200023852 | A | 3/2020 |
| KR | 20200058222 | A | 5/2020 |
| KR | 20210008736 | A | 1/2021 |
| KR | 20210073451 | A | 6/2021 |
| WO | 2010004927 | A1 | 1/2010 |
| WO | 2017094252 | A1 | 6/2017 |
| WO | 2018060773 | A1 | 4/2018 |
| WO | 2018166882 | A1 | 9/2018 |
| WO | 2020197278 | A1 | 10/2020 |
| WO | 2021194285 | A1 | 9/2021 |

OTHER PUBLICATIONS

Besley, T., "The Importance of Adhesive Strength: How to be sure your Adhesive is Strong Enough" webpage, pp. 1-12, PDF of relevant website pages provided, retrieved on Feb. 6, 2025.

Masterbond "How Heat Affects the Lap Shear Strength of Structural Adhesives" webpage, pp. 1-3, PDF of relevant website pages provided, retrieved on Feb. 6, 2025.

The Epoxy Adhesive Test Measurement Guide (1999). 47 pgs, retrieved on Feb. 6, 2025.

International Search Report for PCT Application No. PCTKR20214012783 dated Jan. 6, 2022, 3 pgs. [see p. 2, categorizing the cited references].

International Search Report for Application No. PCT/KR2022/006015 mailed Aug. 11, 2022, pp. 1-3. [see p. 2, categorizing the cited references].

International Search Report for Application No. PCT/KR2022/006013 mailed Aug. 23, 2022, pp. 1-3. [See p. 2, categorizing the cited references].

Machine Translation of: JP 2017-050215 A, Masuda et al., Sep. 3, 2017.

Search Report dated Aug. 12, 2025 from the Office Action for Chinese Application No. 202280006500.9 issued Aug. 14, 2025, pp. 1-3.

* cited by examiner

[FIG. 1]
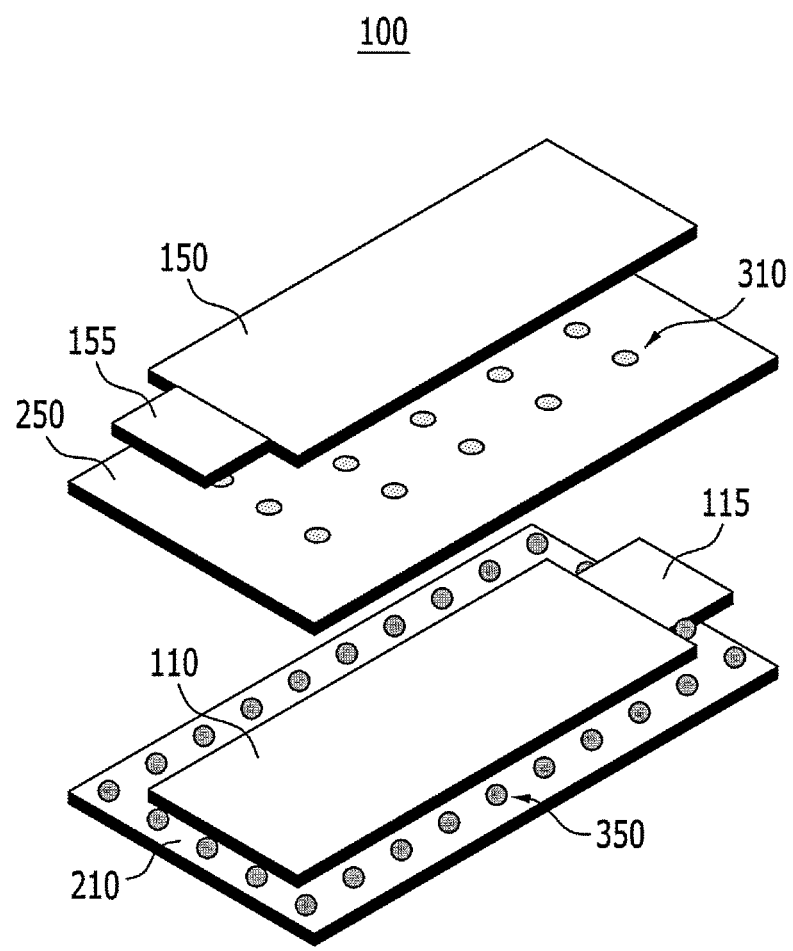

[FIG. 2]
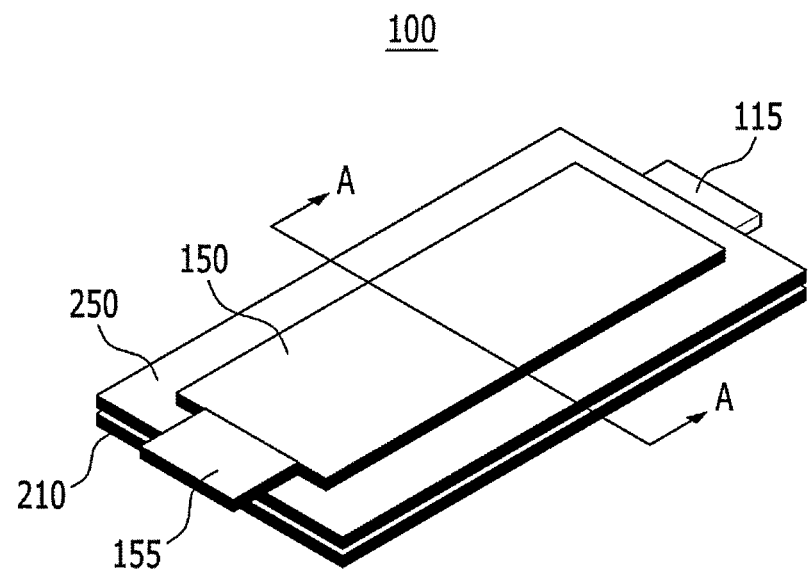
[FIG. 3]
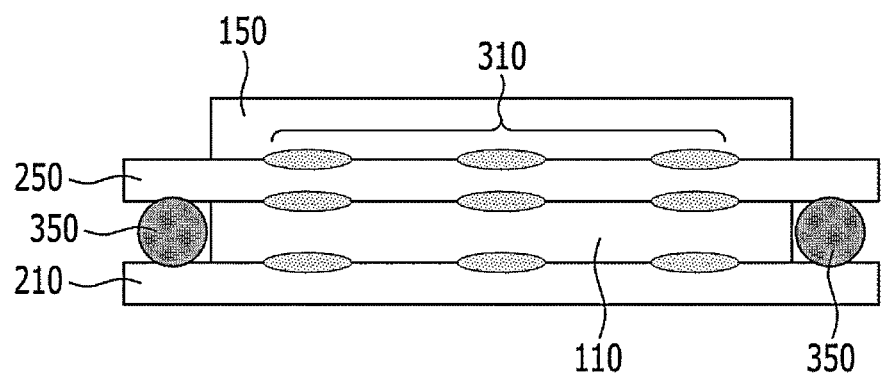

[FIG. 4]
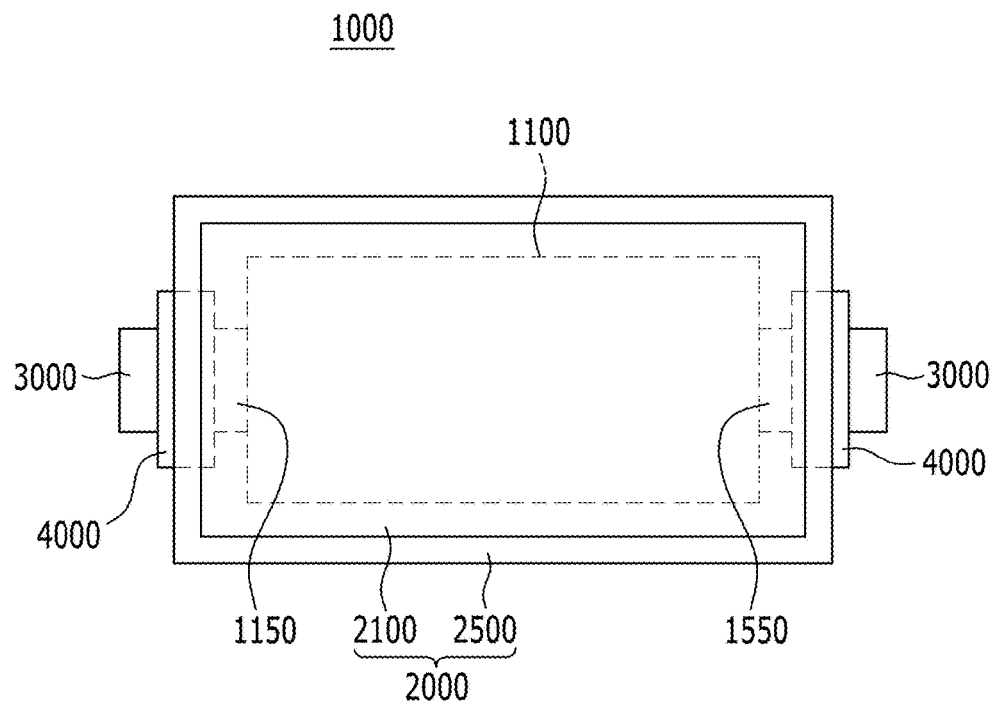
[FIG. 5]
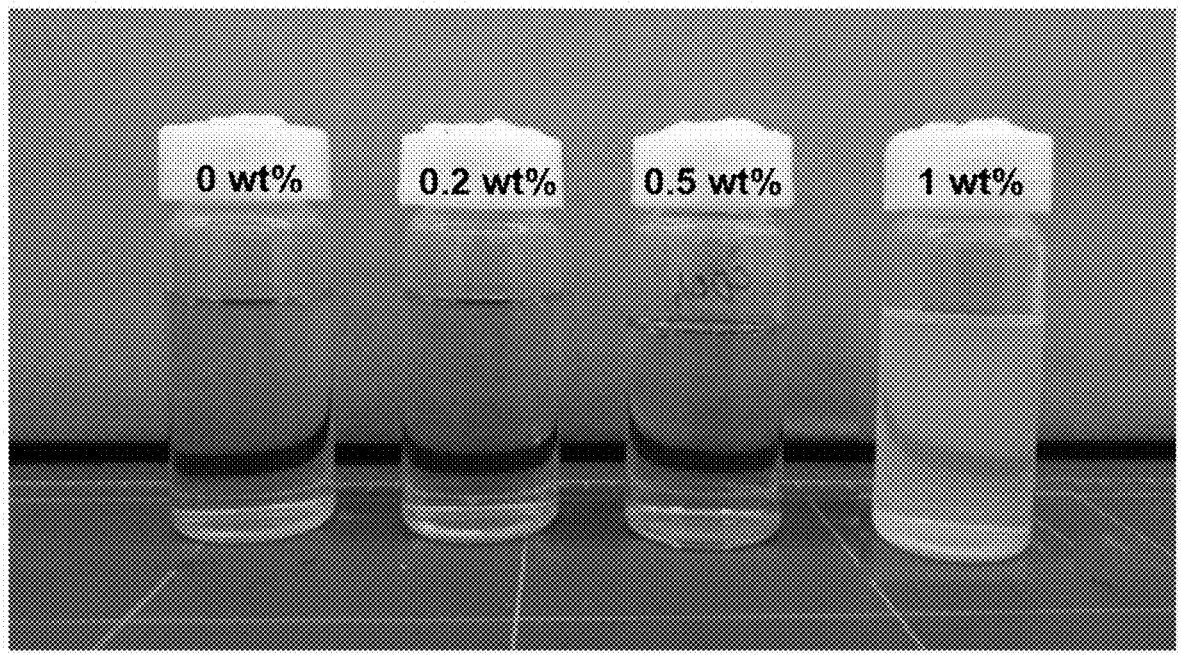

[FIG. 6]
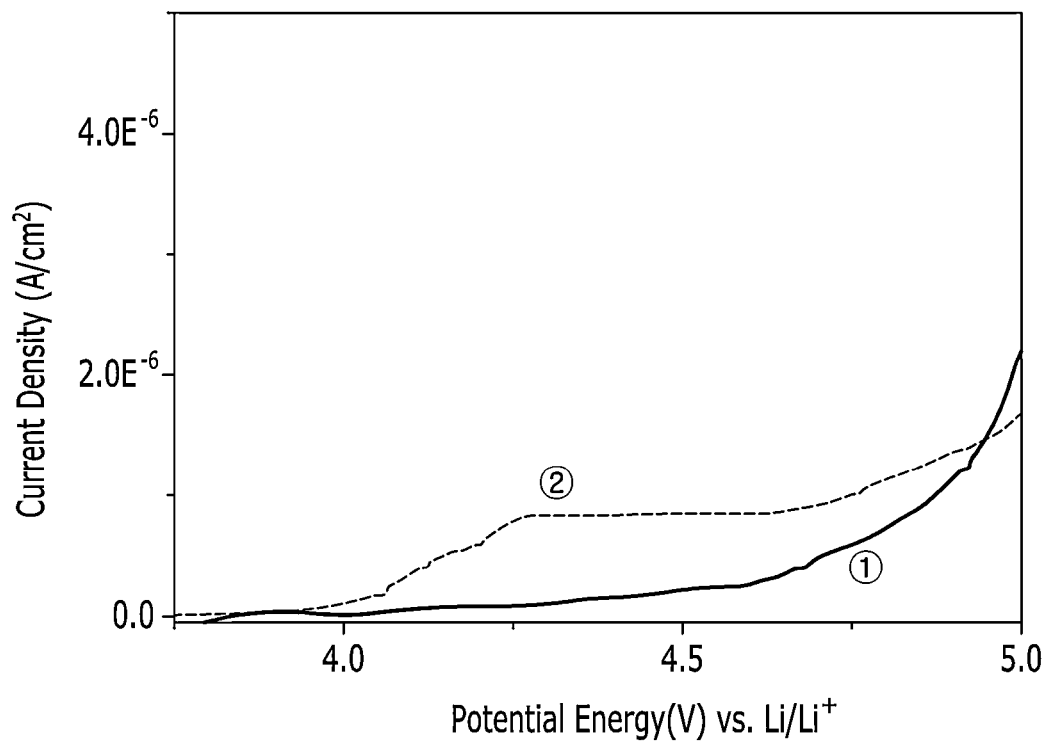
[FIG. 7]
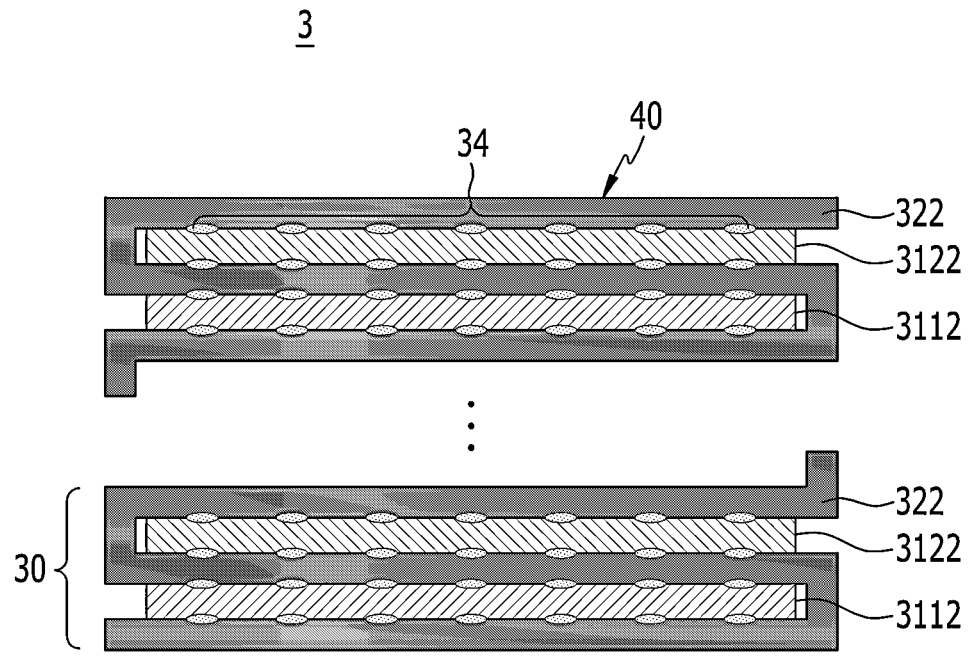

[FIG. 8]
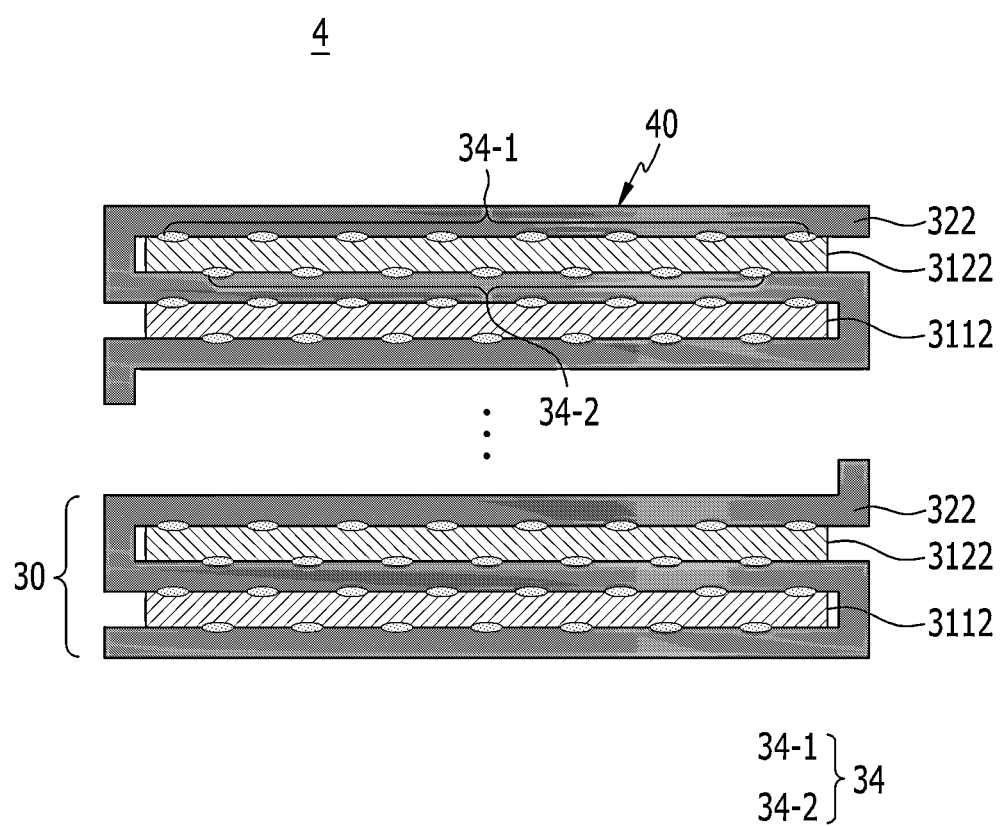

UNIT CELL AND BATTERY CELL INCLUDING THE SAME

CROSS-REFERENCE TO RELATED APPLICATIONS

This application claims priority from Korean Patent Application No. 10-2021-0066460, filed on May 24, 2021, and Korean Patent Application No. 10-2022-0048386, filed on Apr. 19, 2022, the entire disclosures of which are incorporated herein by reference.

BACKGROUND OF THE INVENTION

The present disclosure relates to a unit cell and a battery cell including the same, and more particularly to a unit cell configured to adhere an electrode to a separator as well as a separator to a separator using an adhesive composition instead of a conventional lamination using heat and pressure.

As technology development and demands for mobile devices increase, the demand for batteries as energy sources is rapidly increasing. In particular, secondary batteries have attracted considerable attention as energy sources for power-driven devices, such as electric bicycles, electric vehicles, and hybrid electric vehicles, as well as energy sources for mobile devices, such as mobile phones, digital cameras, laptop computers, and wearable devices.

Based on the shape of its battery case, such secondary batteries may be classified into a cylindrical battery (where an electrode assembly is mounted in a cylindrical metal can), a prismatic battery (where an electrode assembly is mounted in a prismatic metal can), and a pouch-type battery (where an electrode assembly is mounted in a pouch type case formed of an aluminum laminate sheet). Here, the electrode assembly mounted in the battery case is a power generating element, having a structure including a cathode, an anode, and a separator interposed between the cathode and the anode, and capable of being charged and discharged. The electrode assembly may be classified as a jelly-roll type electrode assembly and a stacked type electrode assembly. A jelly-roll type electrode assembly is one having a structure in which a long sheet-type cathode and a long sheet-type anode, which are each coated with active materials, are wound with a separator interposed between the cathode and the anode. A stacked type electrode assembly is one having a structure in which a plurality of cathodes and anodes are sequentially stacked with separators interposed between the cathodes and the anodes.

Among them, particularly advantageous is a pouch-type battery having a structure in which a stacked/folded type electrode assembly is mounted in a pouch-type battery case formed of an aluminum laminate sheet, due to advantages such as low manufacturing costs, small weight, and easy shape deformation, and therefore usage of such an arrangement is gradually increasing.

A stacked type electrode assembly is generally manufactured by preparing unit cells in advance and then stacking a plurality of the unit cells. More specifically, unit cells each comprising a separator-anode-separator-cathode stacked in order can have heat and pressure applied to them via a stacking device, thereby fixing the components to each other.

However, after being alternately stacked in the order of separator-anode-separator-cathode, a part of the separator or electrode may be shifted out of place before entering the stacking device or during the process of stacking, which can cause problems such as breakage occurring or differences in adhesive strength.

BRIEF SUMMARY OF THE INVENTION

According to an aspect of the present disclosure, there is provided a unit cell comprising a stack including an electrode positioned between a first separator and a second separator. The unit cell also includes a first adhesive part positioned at an interface defined between the electrode and at least one of the first and second separators, as well as a second adhesive part positioned at an interface defined between the first separator and the second separator. The first adhesive part is composed of a first adhesive composition, and the second adhesive part is composed of a second adhesive composition, wherein the first adhesive composition has a degree of dispersion in an electrolyte that is greater than a degree of dispersion of the second adhesive composition in the electrolyte.

The first adhesive composition may be composed of at least one of an ethylene-vinyl acetate (EVA)-based material, an acrylic-based material, and an epoxy-based material, and the second adhesive composition may be composed of at least one of an ethylene-vinyl acetate (EVA)-based material, an acrylic-based material, an epoxy-based material, a polyolefin-based material, a rubber-based material, a polyamide-based material, and a polyurethane-based material.

The second adhesive composition may be composed of at least one of a polyolefin-based material, a rubber-based material, a polyamide-based material, and a polyurethane-based material.

The electrode may include a first electrode and a second electrode, wherein the first separator, the first electrode, the second separator, and the second electrode may be stacked in that order.

The first adhesive part may be positioned at at least one interface selected from: between the first electrode and the first separator, between the first electrode and the second separator, and between the second electrode and the second separator.

The first adhesive part and the second adhesive part may each be arranged in a pattern including a plurality of dots.

The plurality of dots may be spaced apart from each other.

According to some other aspects of the present disclosure, there is provided an electrode assembly defined by a plurality of the unit cells stacked along a stacking direction. The electrode assembly includes a first interface defined between the electrode and the first separator, as well as a second interface defined between the electrode and the second separator. The first adhesive part is arranged in a first pattern over the first interface and a second pattern over the second interface, the first and second patterns each including a plurality of dots of the first adhesive part spaced apart from each other in a lateral dimension defined orthogonal to the stacking direction. Each of the plurality of dots of the first pattern are disposed at the same respective positions in the lateral dimension as the plurality of dots of the second pattern.

According to some other aspects of the present disclosure, there is provided an electrode assembly defined by a plurality of the unit cells stacked along a stacking direction. The electrode assembly includes a first interface defined between the electrode and the first separator, as well as a second interface defined between the electrode and the second separator. The first adhesive part is arranged in a first pattern over the first interface and a second pattern over the second interface, the first and second patterns each including a plurality of dots of the first adhesive part spaced apart from each other in a lateral dimension defined orthogonal to the stacking direction. Each of the plurality of dots of the first pattern are disposed at positions in the lateral dimension that are staggered with respect to the plurality of dots of the second pattern.

According to some other aspects of the present disclosure, there is provided a battery cell comprising an electrolyte solution together with an electrode assembly including a stack of a plurality of the unit cells.

The first adhesive part may be at least partially dissolved into the electrolyte solution.

The first adhesive composition may be composed of at least one of an ethylene-vinyl acetate (EVA)-based material, an acrylic-based material, and an epoxy-based material, and the second adhesive composition may be composed of at least one of an ethylene-vinyl acetate (EVA)-based material, an acrylic-based material, an epoxy-based material, a polyolefin-based material, a rubber-based material, a polyamide-based material, and a polyurethane-based material.

A total amount of the first adhesive composition and the second adhesive composition in the battery cell may be from 0.8% to 1.2% by weight relative to a total amount of the electrolyte solution in the battery cell.

The total amount of the first adhesive composition in the battery cell may be from 0.6% to 0.9% by weight relative to the total amount of the electrolyte solution in the battery cell, and the total amount of the second adhesive composition in the battery cell may be from 0.1% to 0.45% by weight relative to the total amount of the electrolyte solution in the battery cell.

The second adhesive composition may be composed of at least one of a rubber-based material, a polyamide-based material, and a polyurethane-based material.

The total amount of the second adhesive composition in the battery cell may be from 0.1% to 0.2% by weight relative to the total amount of the electrolyte solution in the battery cell.

The electrolyte solution may be composed of at least one of an organic liquid electrolyte, an inorganic liquid electrolyte, a solid polymer electrolyte, a gel-type polymer electrolyte, a solid inorganic electrolyte, and an inorganic molten electrolyte.

The first separator and the second separator may each be respective portions of an elongated separator folded to have a zigzag shape.

According to some other aspects of the present disclosure, there is provided a method of fabricating a unit cell. The method in accordance with such aspects includes: applying a first adhesive to either or both of (i) a first face of an electrode or (ii) an abutment region of a first separator; applying the first adhesive to either or both of (i) a second face of the electrode or (ii) an abutment region of a second separator, the second face of the electrode being on an opposite side of the electrode from the first face; applying a second adhesive to either or both of (i) a peripheral region of the first separator or (ii) a peripheral region of the second separator; and forming at least a portion of a stack by stacking the electrode between the first separator and the second separator such that the first face of the electrode abuts the abutment region of the first separator and the second face of the electrode abuts the abutment region of the second separator. The stack is desirably formed such the peripheral region of each of the first and second separators extends outwardly beyond an edge of the electrode, the peripheral regions of each of the first and second separators opposing one another without the electrode interposed therebetween. Moreover, the first adhesive is preferably configured to have a degree of dispersion in an electrolyte that is greater than a degree of dispersion of the second adhesive in the electrolyte.

The degree of dispersion of the first adhesive in the electrolyte may be greater than the degree of dispersion of the second adhesive in the electrolyte.

The peripheral region of each of the first and second separators may extend around a perimeter of the respective first and second separator, such that each of the peripheral regions encircles the abutment region of the respective first and second separator.

The first adhesive may be composed of at least one of an ethylene-vinyl acetate (EVA)-based material, an acrylic-based material, and an epoxy-based material, and the second adhesive may be composed of at least one of an ethylene-vinyl acetate (EVA)-based material, an acrylic-based material, an epoxy-based material, a polyolefin-based material, a rubber-based material, a polyamide-based material, and a polyurethane-based material.

The first adhesive and the second adhesive may be each applied in a respective pattern of dots spaced apart from each other.

The dots in the pattern of dots of the first adhesive may be arranged in a grid of rows and columns of dots.

According to some other aspects of the present disclosure, there is provided a method of fabricating a battery cell. The method in accordance with such aspects includes: forming a stack formed by alternately stacking a plurality of the unit cells, and positioning the stack and an electrolyte in a battery case.

The method of fabricating a battery cell may further comprise dissolving at least a portion of the first adhesive into the electrolyte.

The electrolyte may be a solution composed of at least one of an organic liquid electrolyte, an inorganic liquid electrolyte, a solid polymer electrolyte, a gel-type polymer electrolyte, a solid inorganic electrolyte, and an inorganic molten electrolyte.

A total amount of the first adhesive in the battery case may be from 0.6% to 0.9% by weight of a total amount of the electrolyte in the battery case.

A total amount of the second adhesive in the battery case may be from 0.1% to 0.45% by weight of a total amount of the electrolyte in the battery case.

A total amount of the first adhesive and the second adhesive together in the battery case may be from 0.8% to 1.2% by weight of a total amount of the electrolyte in the battery case.

The total amount of the first adhesive in the battery case may be from 0.6% to 0.9% by weight of the total amount of the electrolyte in the battery case, and the total amount of the second adhesive in the battery case may be from 0.1% to 0.45% by weight of the total amount of the electrolyte in the battery case.

The second adhesive may be composed of at least one of a polyolefin-based material, a rubber-based material, a polyamide-based material, and a polyurethane-based material.

A total amount of the second adhesive in the battery case may be from 0.1% to 0.2% by weight of a total amount of the electrolyte in the battery case.

The first separator and the second separator may each be respective portions of an elongated separator folded to have a zigzag shape.

It is believed that by adhering the electrode to the separator and the separator to another separator using an adhesive composition, instead of a conventional lamination using heat and pressure, at least some aspects of the present invention may minimize or eliminate movement between the electrodes and separators, thereby beneficially reducing deformation and breakage of the electrodes and separators. However, the inventions disclosed herein are not limited to achieving such effects, and other additional effects not explicitly described herein may be achieved by some formulations of the inventions disclosed and claimed herein.

BRIEF DESCRIPTION OF THE DRAWINGS

FIG. 1 is an exploded perspective view of a unit cell according to an embodiment of the present disclosure;

FIG. 2 is a perspective view showing a unit cell in which the components of FIG. 1 are combined;

FIG. 3 is a cross-sectional view taken along the A-A axis of FIG. 2;

FIG. 4 is a top view of a battery cell according to another embodiment of the present disclosure; and FIG. 5 is a diagram showing the results of the dispersion degree according to the content of the adhesive composition contained in the unit cell of FIG. 2.

FIG. 6 is a view showing Linear Sweep Voltammetry (LSV) of the adhesive composition included in the unit cell of FIG. 2;

FIG. 7 is a cross-sectional view showing an electrode assembly according to an embodiment of the present disclosure; and FIG. 8 is a cross-sectional view showing an electrode assembly according to another embodiment of the present disclosure.

DETAILED DESCRIPTION OF THE EMBODIMENTS

Hereinafter, various embodiments of the present disclosure will be described in detail with reference to the accompanying drawings so that those skilled in the art can implement them. The disclosed embodiments may be modified in various different ways, without departing the sprit or scope of the present disclosure.

Portions that are irrelevant to the description will be omitted so as to provide a clear description of the present disclosure. Moreover, like reference numerals designate like elements throughout the specification.

Further, the size and thickness of each element are arbitrarily illustrated in the drawings for convenience of the description, and the present disclosure is not necessarily limited to those illustrated in the drawings. In the drawings, the thickness of layers, regions, etc. are exaggerated for clarity. In the drawings, the thicknesses of some layers and regions are shown to be exaggerated for convenience of the description.

Throughout the specification, when a portion is referred to as "including" a certain component, it means that the portion includes the stated components but does not exclude any other components, unless explicitly described to the contrary.

Further, throughout the specification, references to "cross-sectional" refer to a target portion viewed from the side of a cross section cut vertically.

Hereinafter, a unit cell according to an embodiment of the present disclosure will be described.

FIG. 1 is an exploded perspective view of a unit cell according to an embodiment of the present disclosure. FIG. 2 is a perspective view showing a unit cell in which the components of FIG. 1 are combined. FIG. 3 is a cross-sectional view taken along the A-A axis of FIG. 2.

Referring to FIGS. 1 and 2, a unit cell according to an embodiment of the present disclosure includes: separators 210 and 250 and electrodes 110 and 150, a predetermined number of which are alternately stacked; a first adhesive part 310 that is positioned between the separators 210 and 250 and the respective electrodes 110 and 150 and is composed of a first adhesive composition; and a second adhesive part 350 that is positioned between the separators 210 and 250 themselves and is composed of a second adhesive composition.

More specifically, the separators 210 and 250 include a lower separator 210 and an upper separator 250, and the electrodes 110 and 150 include a first electrode 110 and a second electrode 150, wherein the lower separator 210, the first electrode 110, the upper separator 250 and the second electrode 150 may be stacked in that order.

The first electrode 110 may include a first electrode tab 115 protruding in one direction, and the second electrode 150 may include a second electrode tab 155 protruding in one direction. In one example, as shown in FIGS. 1 and 2, the stacking may be performed such that the upper separator 250 is positioned between the first electrode 110 and the second electrode 150, and the stacking may be performed such that the first electrode tab 115 of the first electrode 110 and the second electrode tab 155 of the second electrode 150 are positioned in opposite directions to each other. However, the present disclosure is not limited thereto, and a structure in which the first electrode tab 115 and the second electrode tab 155 are stacked so as to be positioned in the same direction may also be included in embodiments of the disclosure.

The first electrode 110 and the second electrode 150 may each include an electrode current collector and an active material layer positioned on the electrode current collector. The active material layer may be formed of an electrode composition containing an electrode active material. More specifically, the first electrode 110 and the second electrode 150 may be a cathode and an anode. The cathode may include a cathode current collector and an active material layer containing the cathode active material, and the anode may include an anode current collector and an active material layer containing the anode active material. In one example, the first electrode 110 may be an anode, and the second electrode 150 may be a cathode, but the present disclosure is not limited thereto, and vice versa may be included in embodiments of the disclosure as well.

As the anode active material, an anode active material for a lithium secondary battery well-known in the art may be used, and, as an example, a material such as lithium metal, lithium alloy, petroleum coke, activated carbon, graphite, silicon, tin, metal oxide, or other carbons may be used.

In addition, in one example, the cathode active material may be selected from the group consisting of lithium-cobalt based oxide, lithium-manganese based oxide, lithium-nickel-manganese based oxide, lithium-manganese-cobalt based oxide, lithium-nickel-manganese-cobalt based oxide, and lithium iron phosphate, or may be a combination thereof or a composite oxide thereof.

The anode current collector and the cathode current collector are not particularly limited, as long as they have high conductivity without causing a chemical change in the battery. For example, copper, stainless steel, aluminum, nickel, titanium, calcined carbon, or aluminum or stainless steel that is surface-treated with carbon, nickel, titanium, silver, or the like may be used.

The separators 210 and 250 may separate the first electrode 110 from the second electrode 150 and provide a moving passage of lithium ion. In addition, the separators 210 and 250 include a lower separator 210 and an upper separator 250, and such separators may be made of the same materials or materials which are different from each other.

In one example, the separators 210 and 250 can be used without particular limitation as long as they are normally used as separators in a lithium secondary battery. In particular, it is desirable that the separator has low resistance to ion movement of an electrolyte solution and is excellent in its ability to be impregnated with an electrolyte solution. Specifically, porous polymer films made of polyolefin-based polymers such as ethylene homopolymer, propylene homopolymer, ethylene/butene copolymer, ethylene/hexene copolymer, and ethylene/methacrylate copolymer may be used alone, or a stacked structure having two or more of such layers may be used.

Hereinafter, the first adhesive part 310 and the second adhesive part 350 included in the unit cell will mainly be described.

Referring to FIGS. 1 and 3, the first adhesive part 310 may be positioned at one or more of the following locations: (1) between the first electrode 110 and the lower separator 210; (2) between the first electrode 110 and the upper separator 250; and (3) between the second electrode 150 and the upper separator 250.

Therefore, the first adhesive part 310 can fix the first electrode 110 and the second electrode 150 to the lower separator 210 and/or the upper separator 250, respectively. That is, the first adhesive part 310 can prevent movement between the electrodes 110 and 150 and the separators 210 and 250, and thus it can prevent deformation and breakage of the electrodes 110 and 150 and the separators 210 and 250.

In addition, the second adhesive part 350 may be positioned between the upper separator 250 and the lower separator 210. More specifically, the second adhesive part 350 may be positioned between an end part of the lower separator 210 and an end part of the first electrode 110. Further, the second adhesive part 350 may be positioned between an end part of the upper separator 250 and an end part of the first electrode 110. In other words, the second adhesive part 350 is positioned on the surface of the separators 210 and 250 that is not in contact with the first electrode 110, wherein the second adhesive part 350 may be positioned along the periphery of the first electrode 110. The second adhesive part 350 may be selectively positioned even in the portion where the electrode tabs 115 and 155 protruding from the electrodes 110 and 150 are positioned.

Therefore, the first electrode 110 is positioned between the upper separator 210 and the lower separator 250, and the upper separator 210 and the lower separator 250 can be fixed to each other by the second adhesive part 350, thereby preventing the first electrode 110 from moving between the upper separator 210 and the lower separator 250. In other words, the second adhesive part 350 fixes the upper separator 210 and the lower separator 250 to each other along the periphery of the first electrode 110, thus limiting the space in which the first electrode 110 can move, and thus reducing the possibility of deformation and breakage of the first electrode 110.

As shown in FIGS. 1 and 3, the first adhesive part 310 and the second adhesive part 350 may be formed in a pattern such as a plurality of dots which are spaced apart from each other. Moreover, the intervals between the plurality of dots may be adjusted to be the same or different from each other, if necessary.

By forming the first adhesive part 310 and the second adhesive part 350 in a pattern such as a plurality of spaced apart dots, the electrode assembly can advantageously be rapidly impregnated when the electrolyte solution is injected into the electrode assembly 1100 (FIG. 4) including a plurality of unit cells 100. More specifically, since the plurality of dots are spaced apart from each other in the first adhesive part 310 and the second adhesive part 350, the electrolyte solution may advantageously flow between the plurality of dots. As a result, the manufacturing time of the battery cells 100 (FIG. 4) can be shortened and the yield can also be improved.

The first adhesive part 310 may be composed of a first adhesive composition, and the second adhesive part 350 may be composed of a second adhesive composition. Moreover, since the presence of the first adhesive part 310 may block a lithium ion passage between the electrodes 110 and 150 and the separators 210 and 250, it may be preferable that the first adhesive part 310 is composed of a material having a relatively high dispersion degree or a high solubility in an electrolyte solution. Furthermore, the dispersion degree of the first adhesive composition included in the first adhesive part 310 may be equal to or larger than the dispersion degree of the second adhesive composition included in the second adhesive part 350.

According to an embodiment, the first adhesive composition included in the first adhesive part 310 and the second adhesive composition included in the second adhesive part 350 may include materials having the same composition. In one example, the first adhesive composition may be composed of at least one of an ethylene-vinyl acetate (EVA)-based material, an acrylic-based material, and an epoxy-based material, and the second adhesive composition may be composed of at least one of an ethylene-vinyl acetate (EVA)-based material, an acrylic-based material, an epoxy-based material, a polyolefin-based material, a rubber-based material, a polyamide-based material, and a polyurethane-based material.

Alternatively, according to another embodiment, the first adhesive part 310 and the second adhesive part 350 may include materials having different compositions from one another. More specifically, the first adhesive composition and the second adhesive composition can have different dispersibilities. In other words, the dispersion degree of the first adhesive composition may be larger than the dispersion degree of the second adhesive composition. In one example, the first adhesive composition may be composed of at least one of an ethylene-vinyl acetate (EVA)-based material, an acrylic-based material, and an epoxy-based material, and the second adhesive composition may be composed of at least one of a polyolefin-based material, a rubber-based material, a polyamide-based material, and a polyurethane-based material. For example, when the first adhesive composition is made of an acrylic material, it may exhibit a certain amount of solubility in the electrolyte because the acrylic material includes an ester group.

Therefore, the first adhesive composition included in the first adhesive part 310 may have about the same or may have a higher dispersion degree than the second adhesive composition included in the second adhesive part 350. As a result, when the electrolyte solution is injected into the electrode assembly 1100 (FIG. 4) including a plurality of unit cells 100, the first adhesive part 310 positioned between the electrodes 110 and 150 and the separators 210 and 250 may be at least partially dissolved into the electrolyte solution, so that any obstruction of the lithium ion passage between the electrodes 110 and 150 and the separators 210 and 250 caused by the presence of the first adhesive part 310 may be reduced or eliminated.

Referring to FIG. 6, positioning the first adhesive composition (composed of at least one of an ethylene-vinyl acetate-based material, an acrylic material, and an epoxy-based material) at the location of the first adhesive part 310 (i.e., between the electrodes 110 and 150 and the separators 210 and 250) results in the LSV curve labeled '1.' On the other hand, positioning the second adhesive composition (composed of at least one of a polyolefin-based material, a rubber-based material, a polyamide-based material, and a polyurethane-based material) in the location of the second adhesive part 350 results in the LSV curve labeled '2,' which shows that the oxidation reaction occurs around 4.0 V. That may result in a side reaction in the battery cell, which may be a factor in reducing capacity and lifespan. Therefore, it is preferable not to use the second adhesive composition in the location of the first adhesive part 310. One of the reasons for providing the second adhesive part 350 is to prevent folding of the separator caused during the electrolyte injection process.

The separator according to the embodiment described herein may be a Ceramic Coated Separator (CCS). In general, the separator has a raw film and a coating layer formed on at least one surface of the raw film, and the coating layer may include alumina powder and a binder to aggregate them. In a Safety Reinforced Separator (SRS), a large amount of binder is coated on the surface of the coating layer, but, in CCS, the binder is not coated on the surface of the coating layer, or the binder content distributed on the surface may be very low compared to SRS. For example, in the case of the CCS separator according to the present embodiment, the content of the binder coated on the surface of the coating layer of the separator may be about 3 wt % or less.

When the separator is CCS, since the internal electrodes included in the electrode assembly are transported in an unfixed state, alignment may be disturbed during transport. Of course, when the separator is CCS, it may be fixed by heat and pressure, but the alignment of the internal electrodes may be disturbed even in the process of transferring the electrode and the separator to the fixing device for applying heat and pressure after forming the laminate of the electrode and the separator. In addition, there is a disadvantage in that an expensive separator having a high binder content must be used to attach the electrode and the separator by heat and pressure. On the other hand, according to the present embodiment, it is possible to increase the fixing force while preventing the alignment of the internal electrodes from being disturbed during transport.

FIG. 4 is a top view of a battery cell according to another embodiment of the present disclosure.

Referring to FIGS. 2 and 4, the battery cell 1000 according to another embodiment of the present disclosure includes an electrolyte solution together with the electrode assembly 1100 on which the above-mentioned unit cells 100 are alternately stacked. Here, first electrode tabs 1150 on which the first electrode tabs 115 of the unit cell 100 are stacked, and second electrode tabs 1550 on which the second electrode tabs 155 are stacked, can be electrically connected to electrode leads 3000, respectively. Lead films 4000 may be positioned above and/or below the electrode leads 3000.

Further, the electrode assembly 1100 is mounted inside a battery case 2000, wherein the electrode assembly 1100 and the electrolyte solution may be positioned in a concave receiving part 2100 of the battery case 2000. In addition, a sealing part 2500 of the battery case 2000 may be formed where the outer peripheral surfaces of the battery case 2000 are heat-fused and sealed together.

In one example, the electrolyte solution can be comprised of at least one of an organic liquid electrolyte, an inorganic liquid electrolyte, a solid polymer electrolyte, a gel-type polymer electrolyte, a solid inorganic electrolyte, an inorganic molten electrolyte or the like. The present disclosure is not limited thereto, however, and all electrolyte solutions commonly used in the art can be included.

According to an embodiment of the disclosure, the first adhesive part 310 may be dissolved in the electrolyte solution. More specifically, the first adhesive composition included in the first adhesive part 310 may be dissolved in the electrolyte solution. More preferably, the first adhesive composition included in the first adhesive part 310 may be completely dissolved in the electrolyte solution.

Therefore, in the embodiment of the disclosure, the first adhesive part 310 is dissolved in the electrolyte solution so that the lithium ion passage between the electrodes 110 and 150 and the separators 210 and 250 may not be obstructed, and thus battery performance of the battery cell can be improved.

The content of the first adhesive composition and the second adhesive composition may be from 0.8 wt. % to 1.2 wt. % relative to the total amount (by weight) of the electrolyte solution. More preferably, the content of the first adhesive composition and the second adhesive composition may be from 0.85 wt. % to 1.15 wt. % relative to the amount of the electrolyte solution.

Even more preferably, the content of the first adhesive composition and the second adhesive composition may be from 0.9 wt. % to 1.1 wt. % relative to the amount of the electrolyte solution.

Thus, by having the ratio of the first adhesive composition and the second adhesive composition to the electrolyte solution within the above-discussed range, the first adhesive part 310 can be relatively easily dispersed and dissolved into the electrolyte solution, thereby no longer obstructing the lithium ion passage between the electrodes 110 and 150 and the separators 210 and 250.

By contrast, when the content of the first adhesive composition and the second adhesive composition is less than 0.8 wt % of the content of the electrolyte solution, the adhesive strength between the electrodes 110 and 150 and the separators 210 and 250, or between the lower separator 210 and the upper separator 250, due to the first adhesive part 310 and the second adhesive part 350 may be substantially reduced. In addition, when the content of the first adhesive composition and the second adhesive composition exceeds 1.2 wt. % relative to the amount of the electrolyte solution, the first adhesive part 310 may not be easily dispersed and dissolved in the electrolyte solution, which may cause at least some obstruction of the lithium ion path, thus leading to an uncharged region of the battery cell.

Further, the content of the first adhesive composition may be from 0.6 wt. % to 0.9 wt. % relative to the amount of the electrolyte solution, and the content of the second adhesive composition may be from 0.1 wt. % to 0.45 wt. % relative to the amount of the electrolyte solution. More preferably, the content of the first adhesive composition may be from 0.65 wt. % to 0.85 wt. %, and the content of the second adhesive composition may be from 0.15 wt. % to 0.4 wt. % relative to the amount of the electrolyte solution. In one example, the content of the first adhesive composition may be from 0.7 wt. % to 0.8 wt. %, and the content of the second adhesive composition may be from 0.15 wt. % to 0.35 wt. % relative to the amount of the electrolyte solution.

Therefore, the battery cell 1000 according to the embodiment of the disclosure can include the first adhesive composition and the second adhesive composition in a ratio within the above-mentioned range and fixed between the electrodes 110 and 150 and the separators 210 and 250, whereby the first adhesive part 310 and the second adhesive part 350 can be easily dispersed and dissolved in the electrolyte solution even while preventing the misalignment of an electrode.

In contrast, when the content of the first adhesive composition is less than 0.6 wt. % relative to the amount of the electrolyte solution, the adhesive strength between the first adhesive part 310 and the electrode may be insufficient, which can lead to electrode misalignment. Alternatively, when the content of the first adhesive composition is more than 0.9 wt. % relative to the amount of the electrolyte solution, the first adhesive part 310 may not be easily dispersed and dissolved in the electrolyte solution, which may obstruct the lithium ion path and result in an uncharged region of the battery cell.

Further, when the content of the second adhesive composition is less than 0.1 wt. % relative to the amount of the electrolyte solution, the adhesive strength between the lower separator 210 and the upper separator 250 may be too low. Alternatively, when the content of the second adhesive composition is more than 0.45 wt. % relative to the amount of the electrolyte solution, the amount of the adhesive composition of the second adhesive part 350 may be too large, such that the second adhesive part 350 may extend outside of the area to be applied, which can result in the second adhesive composition flowing out of the cell and causing contamination.

In addition, when the second adhesive composition is composed of at least one of a rubber-based material, a polyamide-based material, and a polyurethane-based material having a small dispersion degree in the electrolyte solution, the content of the second adhesive composition may be from 0.1 wt. % to 0.2 wt. % relative to the amount of the electrolyte solution. More preferably, the content of the second adhesive composition may be from 0.12 wt. % to 0.18 wt. % relative to the amount of the electrolyte solution. In one example, the content of the second adhesive composition may be from 0.14 wt. % to 0.16 wt. % relative to the amount of the electrolyte solution. Thus, in the battery cell 1000 according to the above-discussed embodiment of the disclosure, even if the dispersion degree of the second adhesive composition is relatively small, the second adhesive composition can be contained in an amount in the above-described range to be fixed between the electrodes 110 and 150 and the separators 210 and 250, so that the first adhesive part 310 and the second adhesive part 350 may be easily dispersed and dissolved in the electrolyte solution even while preventing an misalignment of the electrode, In contrast, when the content of the second adhesive composition is less than 0.1 wt. %, there is a problem that the adhesive strength between the lower separator 210 and the upper separator 250 is excessively reduced. Alternatively, when the content of the adhesive composition of the second adhesive part 350 is more than 0.2 wt. %, the adhesive strength between the lower and upper separators 210, 250 may be too large, which can lead to a reduction in the degree of dispersion.

Hereinafter, the present disclosure will be further described with reference to more specific examples. The following examples are for illustrative purposes only, however, and the scope of rights based on the present disclosure is not limited thereto.

Experimental Example 1—Measurement of Dispersion Degree

Using an electrolyte solution in which a lithium salt of 1M $LiPF_6$ was mixed in a ratio of EC:EMC=3:7, the dispersion degrees of an ethylene-vinyl acetate (EVA)-based material, an acrylic-based material, an epoxy-based material, a polyolefin-based material, a rubber-based material, a polyamide-based material, and a polyurethane-based material as an adhesive composition were separately measured.

The acrylic-based material used was an adhesive known as acResin® 204UV available from BASF SE; the EVA-based material used was an adhesive known as Technomelt® 4046 available from Henkel AG & Co. KGaA (hereinafter "Henkel"); the epoxy-based material used was an adhesive known as Loctite® EA608 available from Henkel; the polyolefin-based material used was an adhesive known as Supra502 available from Henkel; the rubber-based material used was an adhesive known as DISPOMELT® 2802 (hereinafter "2802dispomelt") available from Henkel; the polyamide-based material used was an adhesive known as HPX 002 available from Henkel; and the polyurethane-based material used was an adhesive known as EH9702 available from H.B. Fuller Company. In addition, FIG. 5 depicts the degree of dispersion of Technomelt 4046, where the content of the adhesive composition was increased from left to right, and the dispersion degree was evaluated by visual inspection. Specifically, when increasing the proportion of the adhesive composition, the adhesive first appeared to be suspended within the solution at 1 wt. %, as shown at the rightmost side of FIG. 5. Thus, that proportion of adhesive composition was determined to be not acceptable and therefore was categorized as "NG." Experiments were also performed on other materials in the same manner, and the results are shown in Table 1 below.

TABLE 1

| Adhesive composition | | Dispersion degree (based on electrolyte solution) | | | | | |
| --- | --- | --- | --- | --- | --- | --- | --- |
| | | 0.02 wt % | 0.25 wt % | 0.5 wt % | 0.75 wt % | 1. wt % | 1.25 wt % |
| Acrylic-based | acResin 250UV | OK | OK | OK | OK | OK | NG |
| EVA-based | Technomelt 4046 | OK | OK | OK | OK | NG | NG |
| Epoxy-based | Loctite EA608 | OK | OK | OK | OK | NG | NG |
| Polyolefin-based | Supra502 | OK | OK | NG | NG | NG | NG |

TABLE 1-continued

|  | Adhesive composition | Dispersion degree (based on electrolyte solution) | | | | | |
|---|---|---|---|---|---|---|---|
|  |  | 0.02 wt % | 0.25 wt % | 0.5 wt % | 0.75 wt % | 1. wt % | 1.25 wt % |
| Rubber-based | 2802dispomelt | OK | NG | NG | NG | NG | NG |
| Polyamide-based | HPX 002 | OK | NG | NG | NG | NG | NG |
| Polyurethane-based | EH9702 | OK | NG | NG | NG | NG | NG |

Example 1

$LiNi_{0.6}Mn_{0.2}Co_{0.2}O_2$ as a cathode active material, carbon black as a conductive material, and polyvinylidene fluoride (PVdF) as a binder were used, and NMP as a solvent was added to a mixture of cathode active material:conductive material:binder in a weight ratio of 96:2:2 to prepare a cathode active material slurry. The cathode active material slurry was applied to an aluminum current collector, then dried and rolled to manufacture a cathode.

An artificial graphite as an anode active material, carbon black as a conductive material, and SBR emulsion aqueous solution as a binder were used, and water was added to a mixture of anode active material:conductive material:binder in a weight ratio of 96:1:5 to prepare an anode active material slurry. The anode active material slurry was applied to a copper current collector, then dried and rolled to manufacture an anode.

A slurry mixed with $Al_2O_3$ and PVDF in a weight ratio of 94:6 was applied on both sides (each thickness: 3 μm) of a base sheet (thickness: 10 μm) made of polyethylene/polypropylene, and dried at 60° C. to manufacture a separator. The separator is referred to as an upper separator and a lower separator, depending on the position.

As the electrolyte solution, a solution was prepared in which the lithium salt of 1M $LiPF_6$ was mixed in a ratio of EC:EMC=3:7.

The manufactured lower separator, anode, upper separator, and cathode were alternately stacked in that order to manufacture a unit cell in which a first adhesive part composed of acResin 250UV having a content of 0.75 wt. % relative to the amount of the electrolyte solution was positioned between the separator and the anode and between the separator and the cathode, and a second adhesive part composed of acResin 250UV having a content of 0.25 wt. % relative to the amount of the electrolyte solution was positioned between the upper separator and the lower separator.

Example 2

A unit cell was manufactured in the same manner as in Example 1, except that a composition composed of Loctite EA608 was used for the first adhesive part.

Example 3

A unit cell was manufactured in the same manner as in Example 1, except that a composition composed of Technomelt 4046 was used for the first adhesive part.

Example 4

A unit cell was manufactured in the same manner as in Example 1, except that a composition composed of Supra502 was used for the first adhesive part.

Example 5

A unit cell was manufactured in the same manner as in Example 1, except that a composition composed of Loctite EA608 was used for the first adhesive part, and a composition composed of Supra502 was used for the second adhesive part.

Example 6

A unit cell was manufactured in the same manner as in Example 1, except that a composition composed of Technomelt 4046 was used for the first adhesive part, and a composition composed of Supra502 was used for the second adhesive part.

Example 7

A unit cell was manufactured in the same manner as in Example 1, except that a composition composed of 2802dispomelt having a content of 0.15 wt. % relative to the amount of the electrolyte solution was used for the second adhesive part.

Comparative Example 1

A unit cell was manufactured in the same manner as in Example 1, except that a composition having a content of 0.25 wt. % relative to the amount of the electrolyte solution was used for the first adhesive part, and a composition having a content of 0.75 wt. % relative to the amount of the electrolyte solution was used for the second adhesive part.

Comparative Example 2

A unit cell was manufactured in the same manner as in Example 1, except that a composition having a content of 0.5 wt. % relative to the amount of the electrolyte solution was used for the first adhesive part, and a composition having a content of 0.25 wt. % relative to the amount of the electrolyte solution was used for the second adhesive part.

Comparative Example 3

A unit cell was manufactured in the same manner as in Example 1, except that a composition having a content of 0.5 wt. % relative to the amount of the electrolyte solution was used for the second adhesive part.

Comparative Example 4

A unit cell was manufactured in the same manner as in Example 1, except that a composition composed of Supra502 was used for the first adhesive part, and a composition composed of Supra502 was used for the second adhesive part.

Comparative Example 5

A unit cell was manufactured in the same manner as in Example 1, except that a composition composed of Supra502 was used for the first adhesive part.

Experimental Example 2—Measurement of Dispersion Degree, Viscosity, and Ionic Conductivity For the battery cells manufactured in Examples 1 to 7 and Comparative Examples 1 to 5, measurements of the dispersion degree, viscosity, and ionic conductivity were performed on the mixture of the adhesive with electrolyte solution.

The dispersion degree was measured in the same manner as in Experimental Example 1, and the results are shown in Table 2 below.

The ionic conductivity was measured with an ionic conductivity measuring device available from Mettler-Toledo, LLC and designated Cond probe InLab 710.

The viscosity was measured utilizing a viscometer sold by AMETEK Brookfield with model number DV2T LV TJ10. The measurement was performed under the condition of 10 rpm by replacing the spindle part of the viscometer with a cone and plate, and applying a CPA-40Z cone.

Here, it was judged to be suitable if the viscosity and the ionic conductivity values of the mixture were within ±12% of the corresponding values for the electrolyte itself (viscosity of 3.78 cPs@25° C. and ionic conductivity of 8.65 mS/cm), in which the lithium salt of 1M $LiPF_6$ is mixed with EC:EMC=3:7. The results are shown in Table 2 below.

TABLE 2

|  | First adhesive part | | Second adhesive part | | Dispersion degree | Viscosity (cPs@25° C.) | Ionic conductivity (mS/cm) |
| --- | --- | --- | --- | --- | --- | --- | --- |
|  | Component | Content | Component | Content |  |  |  |
| Example 1 | acResin 250UV | 0.75 wt % | acResin 250UV | 0.25 wt % | OK | 4.08 | 8.45 |
| Example 2 | acResin 250UV | 0.75 wt % | Loctite EA608 | 0.25 wt % | OK | 4.10 | 8.40 |
| Example 3 | acResin 250UV | 0.75 wt % | Technomelt 4046 | 0.25 wt % | OK | 4.11 | 8.42 |
| Example 4 | acResin 250UV | 0.75 wt % | Supra502 | 0.25 wt % | OK | 4.11 | 8.27 |
| Example 5 | Loctite EA608 | 0.75 wt % | Supra502 | 0.25 wt % | OK | 4.17 | 8.41 |
| Example 6 | Technomelt 4046 | 0.75 wt % | Supra502 | 0.25 wt % | OK | 4.21 | 8.33 |
| Example 7 | acResin 250UV | 0.75 wt % | 2802dispomelt | 0.15 wt % | OK | 4.15 | 8.25 |
| Comparative Example 1 | acResin 250UV | 0.25 wt % | acResin 250UV | 0.75 wt % | OK | 4.08 | 8.45 |
| Comparative Example 2 | acResin 250UV | 0.5 wt % | acResin 250UV | 0.25 wt % | OK | 3.95 | 8.56 |
| Comparative Example 3 | acResin 250UV | 0.75 wt % | acResin 250UV | 0.5 wt % | NG | — | — |
| Comparative Example 4 | Supra502 | 0.75 wt % | Supra502 | 0.25 wt % | NG | — | — |
| Comparative Example 5 | Supra502 | 0.75 wt % | acResin 250UV | 0.25 wt % | NG | — | — |

Experimental Example 3 (Measurement of Electrode Misalignment)

For the unit cells manufactured in Examples 1 to 7 and Comparative Examples 1 to 5, the electrode misalignment was measured at a resolution of 33 um/pixel under the conditions of 170 kV, 200 umA, and 34 W by using Computerized Tomography (CT) Scanner from GE. The results are shown in Table 3 below.

TABLE 3

|  | First adhesive part | | Second adhesive part | | Electrode misalignment |
| --- | --- | --- | --- | --- | --- |
|  | Component | Content | Component | Content |  |
| Example 1 | acResin 250UV | 0.75 wt % | acResin 250UV | 0.25 wt % | OK |
| Example 2 | acResin 250UV | 0.75 wt % | Loctite EA608 | 0.25 wt % | OK |
| Example 3 | acResin 250UV | 0.75 wt % | Technomelt 4046 | 0.25 wt % | OK |
| Example 4 | acResin 250UV | 0.75 wt % | Supra502 | 0.25 wt % | OK |
| Example 5 | Loctite EA608 | 0.75 wt % | Supra502 | 0.25 wt % | OK |
| Example 6 | Technomelt 4046 | 0.75 wt % | Supra502 | 0.25 wt % | OK |
| Example 7 | acResin 250UV | 0.75 wt % | 2802dispomelt | 0.15 wt % | OK |
| Comparative Example 1 | acResin 250UV | 0.25 wt % | acResin 250UV | 0.75 wt % | NG |
| Comparative Example 2 | acResin 250UV | 0.5 wt % | acResin 250UV | 0.25 wt % | NG |
| Comparative Example 3 | acResin 250UV | 0.75 wt % | acResin 250UV | 0.5 wt % | OK |

TABLE 3-continued

|  | First adhesive part | | Second adhesive part | | Electrode |
|---|---|---|---|---|---|
|  | Component | Content | Component | Content | misalignment |
| Comparative Example 4 | Supra502 | 0.75 wt % | Supra502 | 0.25 wt % | OK |
| Comparative Example 5 | Supra502 | 0.75 wt % | acResin 250UV | 0.25 wt % | OK |

<Analysis of Experimental Results>

Referring to Table 1 to Table 3, when a composition composed of acResin 250UV having a content of 0.75 wt. % was used for the first adhesive part and a composition composed of either acResin 250UV, Loctite EA608, or Technomelt 4046, each having a content of 0.25 wt. %, was used for the second adhesive part, as in Examples 1 to 3, respectively, the dispersion degree, viscosity, and ionic conductivity results were all excellent, and electrode misalignment did not occur.

By contrast, when a composition composed of Supra502 with a content of 0.75 wt. % was used for the first adhesive part and a composition composed of Supra502 with a content of 0.25 wt. % was used for the second adhesive part, although electrode misalignment did not occur, the degree of dispersion was too low, and the viscosity and ionic conductivity could not be measured. In addition, the same results also occurred in the case of 2802dispomelt, HPX 002 and EH9702 (which have low degrees of dispersion).

Therefore, when the dispersion degrees of the first adhesive part and the second adhesive part are the same or similar to each other, unlike Comparative Example 4, it is acceptable for the first adhesive part and the second adhesive part to be comprised of at least one of acResin 250UV, Loctite EA608, and Technomelt 4046 having a relatively high dispersion degree, as in Examples 1 to 3.

In the case of Comparative Example 2, in which the total content of the first adhesive part and the second adhesive part was small, unlike Example 1, electrode misalignment occurred. Further, in the case of Comparative Example 3, in which the total content of the first adhesive part and the second adhesive part was large, unlike Example 1, the dispersion degree was excessively low, and the viscosity and ionic conductivity could not be measured.

Thus, good results occur when the total content of the first adhesive part and the second adhesive part is in the range of 0.8 wt. % to 1.2 wt. %, as in Example 1.

In contrast, when the content of the first adhesive part is small and the content of the second adhesive part is large, unlike Example 1 (where the total content of the first adhesive part and the second adhesive part are the same), electrode misalignment can result. Further, when the content of the first adhesive part is small (as in the case of Comparative Example 2, and unlike Example 1), electrode misalignment can also result. In addition, when the content of the second adhesive part is large (as in the case of Comparative Example 3, and unlike Example 1), the dispersion degree is excessively low, and thus the viscosity and ionic conductivity cannot be measured.

Thus, good results occur when the first adhesive part is in the range of 0.6 wt. % to 0.9 wt. %, and the content of the second adhesive part is in the range of 0.1 wt. % to 0.45 wt. %, as in Example 1.

In addition, referring to Tables 1 to 3, when a composition comprised of acResin 250UV, Loctite EA608, and Technomelt 4046, each having a content of 0.75 wt. %, was used for the first adhesive part and a composition comprised of Supra502 having a content of 0.25 wt. % was used for the second adhesive part, as in Examples 4 to 6, the dispersion degree, viscosity, and ionic conductivity were all excellent, and no electrode misalignment occurred.

In contrast, when a composition comprised of Supra502 having a content of 0.75 wt. % was used for the first adhesive part and a composition comprised of acResin 250UV having a content of 0.25 wt. % was used for the second adhesive part (as in Comparative Example 5), electrode distortion did not result, but the dispersion was excessively low, and thus the viscosity and ionic conductivity could not be measured. In addition, the same results also occurred where 2802dispomelt, HPX 002, or EH9702 (having a lower dispersion degree than Supra502) were used for the first adhesive part.

Therefore, when the difference between the dispersion degrees of the first adhesive part and the second adhesive part is large, unlike Comparative Example 5, it is acceptable for the first adhesive part to be composed of at least one of acResin 250UV, Loctite EA608, and Technomelt 4046 having a relatively high dispersion degree and for the second adhesive part to be comprised of at least one of Supra502, 2802dispomelt, HPX 002, and EH9702 having a relatively low dispersion degree, as in Examples 4 to 6.

In the case of Comparative Example 3, in which the content of the first adhesive part was large unlike Comparative Example 2, the electrode misalignment did not result, but the dispersion degree was excessively low, and thus the viscosity and ionic conductivity could not be measured. In addition, when the content of the second adhesive part increased, the dispersion degree was excessively low, and thus the viscosity and ionic conductivity could not be measured.

Thus, good results occur when the first adhesive part is in the range of 0.6 wt. % to 0.9 wt. %, and the content of the second adhesive part is in the range of 0.1 wt. % to 0.45 wt. %, as in Example 1.

Referring to Tables 1 to 3, when a composition composed of acResin 250UV with a content of 0.75 wt. % was used for the first adhesive part and a composition composed of 2802 dispomelt with a content of 0.15 wt. % was used for the second adhesive part, as in Example 7, the dispersion degree, viscosity, and ionic conductivity were all excellent, and the electrode misalignment did not result.

If the dispersion degree of the second adhesive part is excessively low, the viscosity and ionic conductivity cannot be measured. Therefore, in the case of a second adhesive part utilizing 2802dispomelt, HPX 002, or EH9702, for which the dispersibility of the adhesive composition is excessively low, it is acceptable if the amount of the second adhesive part is in the range of 0.1 wt. % to 0.2 wt. %, as in Example 7.

FIG. 7 is a cross-sectional view showing an electrode assembly according to an embodiment of the present disclosure.

Referring to FIG. 7, the electrode assembly 3 according to the present embodiment may include an electrode stack 40 manufactured by repeatedly forming a basic unit 30 a plurality of times. Such basic unit 30 may be a unit in which the separator 322 is folded to have a zigzag shape, covers the electrode 31, and the electrode 31 and the separator 322 are stacked. That is, in the basic unit 30, one side and the other side of the separator 322 are sequentially folded to cover the electrode 31, and the electrode 31 and the separator 322 may be sequentially stacked.

A fixing tape may be attached to the electrode assembly 3, but one end of the separator 322 may cover a portion of the outer surface of the electrode stack 40 instead of the fixing tape. The basic unit 30 of the present embodiment may be in a state in which the electrodes 3112 and 3122 and the separator 322 are adhered to each other with an adhesive 34. Such adhesive 34 may preferably be the same first adhesive composition included in the first adhesive part 310 discussed above. Accordingly, the alignment between the electrodes 3112 and 3122 and the separator 322 may be maintained by the adhesive force of the adhesive 34. A method and apparatus for assembling such an electrode stack 40 with a zigzag folded separator and with adhesive 34 applied between successive layers of electrode and separator is disclosed in International Publication No. WO 2021/194285, entitled Cell Manufacturing Device And Method, the entire contents of which are incorporated herein by reference.

In the electrode stack 40 of this embodiment, the separator 322 covers the upper and lower portions and one side of the electrodes 3112 and 3122, so that the stacking alignment of the basic units 30 can be maintained without the fixing tape. In addition, when the fixing tape is attached to the outside of the electrode stacked body 40 of this embodiment or one end of the separator 322 is wrapped around the electrode stacked body 40, the stacking alignment of the basic units 30 is more stably maintained.

Also, in the electrode assembly 3 manufactured in this embodiment, the adhesive 34 may be disposed at the same lateral positions between the electrodes 3112 and 3122 and the separator 322. For example, as shown in FIG. 7, in the electrode assembly 3 of this embodiment, the adhesive 34 positioned between the lower portion of the first electrode 3112 and the separator 322 may have the same lateral positions (orthogonal to the stacking direction) as the adhesive 34 between the upper portion of the first electrode 3112 and the separator 322 Moreover, the spacings between the adhesive 34 positions at each of the those two interfaces may be equal to each other.

Accordingly, in the electrode assembly 3 manufactured in this embodiment, the adhesive 34 is disposed at the same positions between the electrodes 3112 and 3122 and the separator 322, which beneficially reduces process time and increases efficiency.

FIG. 8 is a cross-sectional view showing an electrode assembly according to another embodiment of the present disclosure.

Referring to FIG. 8, the locations of the adhesive 34 may be staggered in alternating layers. For example, as shown in FIG. 8, in the electrode assembly 4 of this embodiment, the first adhesive 34-1 positioned between the lower portion of the first electrode 3112 and the separator 322 may have positions within the lateral plane that are shifted with respect to those of the second adhesive 34-2 positioned between the upper portion of the first electrode 3112 and the separator 322, although the spacings between the adhesive positions in each of those planes may be equal to each other.

However, the present invention is not limited thereto, and the structure in which the first adhesive 34-1 and the second adhesive 34-2 are displaced from each other may be accomplished in various ways.

Accordingly, by staggering the positions of the adhesive 34 in successive layers, it is possible to minimize an increase in the thickness of the electrode assembly 4 due to the adhesive 34. In addition, since the adhesives 34 disposed in adjacent layers are displaced from each other, the adhesive 34 may be more easily dissolved in the electrolyte when provided in the battery cell, as described above.

The first adhesive composition included in the first adhesive part 310 may be used as the adhesive 34 used in the electrode assemblies 3 and 4 according to FIGS. 7 and 8.

Although the invention has been shown and described with reference to preferred embodiments, it is to be understood that the invention is not limited to such disclosed embodiments, but, on the contrary, is intended to cover various modifications and equivalent arrangements included within the spirit and scope of the appended claims.

DESCRIPTION OF REFERENCE NUMERALS

100: unit cell
110: first electrode
150: second electrode
210: lower separator
250: upper separator
310: first adhesive part
350: second adhesive part
1000: battery cell
1100: electrode assembly
2000: battery case
3000: electrode lead
4000: lead film

The invention claimed is:

1. A unit cell comprising:
a stack including an electrode positioned between a first separator and a second separator;
a first adhesive part that is positioned at an interface defined between the electrode and at least one of the first and second separators, the first adhesive part being composed of a first adhesive composition; and
a second adhesive part that is positioned at an interface defined between the first separator and the second separator, such that the second adhesive part fixes the first and second separators to each other, the second adhesive part being composed of a second adhesive composition,
wherein the first adhesive composition has a degree of dispersion in an electrolyte that is greater than a degree of dispersion of the second adhesive composition in the electrolyte.

2. The unit cell of claim 1, wherein:
the first adhesive composition is composed of at least one of an ethylene-vinyl acetate (EVA)-based material, an acrylic-based material, and an epoxy-based material, and
the second adhesive composition is composed of at least one of an ethylene-vinyl acetate (EVA)-based material, an acrylic-based material, an epoxy-based material, a polyolefin-based material, a rubber-based material, a polyamide-based material, and a polyurethane-based material.

3. The unit cell of claim 1, wherein:
the second adhesive composition is composed of at least one of a polyolefin-based material, a rubber-based material, a polyamide-based material, and a polyurethane-based material.

4. The unit cell of claim 1, wherein:
the electrode comprises a first electrode and a second electrode, and
wherein the first separator, the first electrode, the second separator, and the second electrode are stacked in that order.

5. The unit cell of claim 4, wherein:
the first adhesive part is positioned at at least one interface selected from: between the first electrode and the first separator, between the first electrode and the second separator, and between the second electrode and the second separator.

6. The unit cell of claim 1, wherein:
the first adhesive part and the second adhesive part are each arranged in a pattern including a plurality of dots.

7. The unit cell of claim 6, wherein:
the plurality of dots are spaced apart from each other.

8. An electrode assembly defined by a plurality of the unit cells of claim 1 stacked along a stacking direction, wherein:
the interface defined between the electrode and the at least one of the first and second separators includes a first interface defined between the electrode and the first separator and a second interface defined between the electrode and the second separator; and
the first adhesive part is arranged in a first pattern over the first interface and a second pattern over the second interface, the first and second patterns each including a plurality of dots of the first adhesive part spaced apart from each other in a lateral dimension defined orthogonal to the stacking direction, wherein each of the plurality of dots of the first pattern are disposed at the same respective positions in the lateral dimension as the plurality of dots of the second pattern.

9. An electrode assembly defined by a plurality of the unit cells of claim 1 stacked along a stacking direction, wherein:
the interface defined between the electrode and the at least one of the first and second separators includes a first interface defined between the electrode and the first separator and a second interface defined between the electrode and the second separator; and
the first adhesive part is arranged in a first pattern over the first interface and a second pattern over the second interface, the first and second patterns each including a plurality of dots of the first adhesive part spaced apart from each other in a lateral dimension defined orthogonal to the stacking direction, wherein the plurality of dots of the first pattern are disposed at positions in the lateral dimension that are staggered with respect to the plurality of dots of the second pattern.

10. A battery cell comprising an electrolyte solution together with an electrode assembly including a stack of a plurality of the unit cells of claim 1.

11. The battery cell of claim 10, wherein:
the first adhesive part is at least partially dissolved into the electrolyte solution.

12. The battery cell of claim 10, wherein:
the first adhesive composition is composed of at least one of an ethylene-vinyl acetate (EVA)-based material, an acrylic-based material, and an epoxy-based material, and
the second adhesive composition is composed of at least one of an ethylene-vinyl acetate (EVA)-based material, an acrylic-based material, an epoxy-based material, a polyolefin-based material, a rubber-based material, a polyamide-based material, and a polyurethane-based material.

13. The battery cell of claim 12, wherein:
a total amount of the first adhesive composition and the second adhesive composition in the battery cell is from 0.8% to 1.2% by weight relative to a total amount of the electrolyte solution in the battery cell.

14. The battery cell of claim 13, wherein:
the total amount of the first adhesive composition in the battery cell is from 0.6% to 0.9% by weight relative to the total amount of the electrolyte solution in the battery cell, and
the total amount of the second adhesive composition in the battery cell is from 0.1% to 0.45% by weight relative to the total amount of the electrolyte solution in the battery cell.

15. The battery cell of claim 12, wherein:
the second adhesive composition is composed of at least one of a rubber-based material, a polyamide-based material, and a polyurethane-based material.

16. The battery cell of claim 15, wherein:
the total amount of the second adhesive composition in the battery cell is from 0.1% to 0.2% by weight relative to the total amount of the electrolyte solution in the battery cell.

17. The battery cell of claim 10, wherein:
the electrolyte solution is composed of at least one of an organic liquid electrolyte, an inorganic liquid electrolyte, a solid polymer electrolyte, a gel-type polymer electrolyte, a solid inorganic electrolyte, and an inorganic molten electrolyte.

18. The battery cell of claim 1, wherein:
the first separator and the second separator are each respective portions of an elongated separator folded to have a zigzag shape.

\* \* \* \* \*